US012496738B2

(12) United States Patent
Liu

(10) Patent No.: US 12,496,738 B2
(45) Date of Patent: Dec. 16, 2025

(54) INTEGRATED PAPER AND ADHESIVE TAPE CUTTING DEVICE

(71) Applicant: Yong Liu, Zhejiang (CN)

(72) Inventor: Yong Liu, Zhejiang (CN)

( * ) Notice: Subject to any disclaimer, the term of this patent is extended or adjusted under 35 U.S.C. 154(b) by 0 days.

(21) Appl. No.: 19/021,857

(22) Filed: Jan. 15, 2025

(65) Prior Publication Data

US 2025/0196383 A1 Jun. 19, 2025

Related U.S. Application Data

(63) Continuation-in-part of application No. 18/797,836, filed on Aug. 8, 2024, now Pat. No. 12,263,609, and a continuation-in-part of application No. 18/539,909, filed on Dec. 14, 2023, now Pat. No. 12,090,678.

(30) Foreign Application Priority Data

Jan. 4, 2025 (CN) ......................... 202520014800.2

(51) Int. Cl.
*B26D 1/01* (2006.01)
*B65H 35/00* (2006.01)

(52) U.S. Cl.
CPC ......... *B26D 1/015* (2013.01); *B65H 35/0026* (2013.01); *B26D 2210/11* (2013.01)

(58) Field of Classification Search
CPC ........... B26B 27/00; B26B 3/08; B26B 29/06; B26D 2001/006; B26D 1/045; B26D 2210/11; B65H 2701/5112; B65H 35/002; B65H 2301/51532; B65H 2701/1944; B65H 2301/515123; B65H 2301/515; B65H 2301/51512; B65H 2301/515126
USPC ........ 83/701, 651, 614, 635, 649; 30/278, 2, 30/280, 294, 289, 298, 298.4; D8/14, 48, D8/98; D18/34.3, 34.8
See application file for complete search history.

(56) References Cited

U.S. PATENT DOCUMENTS

| | | | | | |
|---|---|---|---|---|---|
| 2,294,018 | A * | 8/1942 | Borst | B26B 3/08 30/294 |
| 3,991,923 | A * | 11/1976 | Nishikawa | B65H 35/0026 225/21 |
| 5,638,603 | A * | 6/1997 | Li | B26B 27/00 30/294 |
| D527,603 | S | 9/2006 | Gullicks | |

(Continued)

FOREIGN PATENT DOCUMENTS

| | | | | |
|---|---|---|---|---|
| DE | 202012006366 U1 * | 11/2013 | B26B 27/00 |
| GB | 2528171 A * | 1/2016 | B65B 67/08 |

OTHER PUBLICATIONS

Amazon.com product page ASIN: B07Q49LCSP Title: Gomake Wrapping Paper Cutter 3PCS Gift Wrap Cutter, Concealed Blade Safety Knife with 10 Replaceable Blades Publisher: Amazon.com Publication date: Mar. 28, 2019 Place of publication: United States Pages submitted: 1-4.

*Primary Examiner* — Ghassem Alie

(57) ABSTRACT

Embodiments of the present application disclose an integrated paper and adhesive tape cutting device, including a housing, where the housing includes a paper cutting housing and a paper separating housing; a component for pulling out paper from a paper roll inside a paper separating component for cutting is arranged below the paper cutting housing; and a cutting device is arranged on an outer wall of the housing to cut an adhesive tape.

19 Claims, 9 Drawing Sheets

(56) References Cited

U.S. PATENT DOCUMENTS

| | | | | |
|---|---|---|---|---|
| 8,065,944 | B1 * | 11/2011 | Speas, Jr. | B26D 1/02<br>83/485 |
| 8,469,072 | B1 * | 6/2013 | Baca | B65H 35/0073<br>156/577 |
| 11,717,977 | B1 | 8/2023 | Xie | |
| 2006/0236550 | A1 | 10/2006 | Gullicks | |
| 2023/0039376 | A1 | 2/2023 | Moroyama | |
| 2023/0057453 | A1 * | 2/2023 | North | B65H 35/06 |
| 2024/0042456 | A1 | 2/2024 | Wang | |
| 2024/0227216 | A1 | 7/2024 | Yaguchi | |

* cited by examiner

INTEGRATED PAPER AND ADHESIVE TAPE CUTTING DEVICE

CROSS REFERENCE TO RELATED APPLICATIONS

This application claims priority benefits to Chinese Patent Application No. 2025200148002, filed on Jan. 4, 2025, and is a continuation-in-part of U.S. patent application Ser. No. 18/797,836 filed on Aug. 8, 2024, which is a continuation-in-part of U.S. patent application Ser. No. 18/539,909, filed on Dec. 14, 2023.

TECHNICAL FIELD

Embodiments of the present application relate to the field of paper roll cutting and adhesive tape cutting, in particular to an integrated paper and adhesive tape cutting device.

BACKGROUND

Paper cutting devices are widely used in the industries such as office, printing and packaging, and are used for cutting paper or similar materials into required sizes and shapes. The traditional paper cutting devices each usually includes a fixed blade and a manual or electric paper feeding system, and has a single function.

SUMMARY

A first aspect of embodiments of the present application provides an integrated paper and adhesive tape cutting device, including: a housing which includes a paper cutting housing; a paper picking component which includes a first portion and a second portion connected to the first portion, where one end of the second portion is connected to the paper cutting housing, the first portion is in an elongated shape, and one end of the first portion is provided with a flat and pointed tip capable of picking paper upwards; a slit which is formed between the paper cutting housing and the paper picking component and is configured for paper feeding; a paper cutter which is arranged inside the slit, where a cutting edge of the paper cutter faces the tip, and the paper cutter is configured to cut the paper entering the slit; and a guiding and pressing structure, where two ends of the guiding and pressing structure are respectively arranged on two sides of the paper picking component; and during operation of a paper cutting device, the guiding and pressing structure is capable of continuously pressing the paper entering the slit downwards from two sides of the paper picking component to bend the paper, and keeping the stiffness and bending tension when the paper is cut by the paper cutter.

In some embodiments, a paper separating housing is further included, the paper separating housing has a first end and a second end which are axially through and open, the paper separating housing is defined by means of a side wall thereof to form a cavity capable of accommodating an elongated paper roll, and an outer wall from the first end to the second end defines the length of the paper separating housing. An adhesive tape cutting assembly is fixedly mounted on an outer wall of the housing and is configured to be sleeved with an adhesive tape roll and cut an adhesive tape.

In some embodiments, the adhesive tape cutting assembly is included, is fixedly mounted on the outer wall of the housing and is configured to be sleeved with the adhesive tape roll and cut the adhesive tape. The adhesive tape cutting assembly includes: an adhesive tape sleeving shaft which is connected to the outer wall of the paper separating housing, is selectively sleeved with the adhesive tape roll, and allows the adhesive tape roll to rotate stably so as to pull out the adhesive tape; and a knife fixing member which is arranged on the same side as the adhesive tape sleeving shaft and connected to the outer wall of the paper separating housing, a serrated knife being mounted on the knife fixing member and configured to be capable of cutting the adhesive tape pulled out from the adhesive tape roll.

It can be seen from the analysis that the present disclosure provides the integrated paper and adhesive tape cutting device, through a series of well-designed technical features, the operation convenience, the cutting precision and the stability and reliability of an apparatus are remarkably improved, meanwhile, the integrity of the paper and the adhesive tape is protected, and maintenance and cleaning are facilitated. Such design is particularly suitable for occasions where the paper and the adhesive tape need to be processed efficiently, thereby meeting diversified use requirements of users. By providing the stable guidance and support, the operation experience and working efficiency of the users are remarkably improved under the cooperative action of functional modules.

BRIEF DESCRIPTION OF THE DRAWINGS

Drawings constituting a portion of the present application are used for providing a further understanding to the present application. Schematic embodiments of the present application and descriptions thereof are intended to explain the present application, and should not be construed to unduly limit the present application. In the drawings.

DESCRIPTION OF REFERENCE NUMERALS

Figure 1:
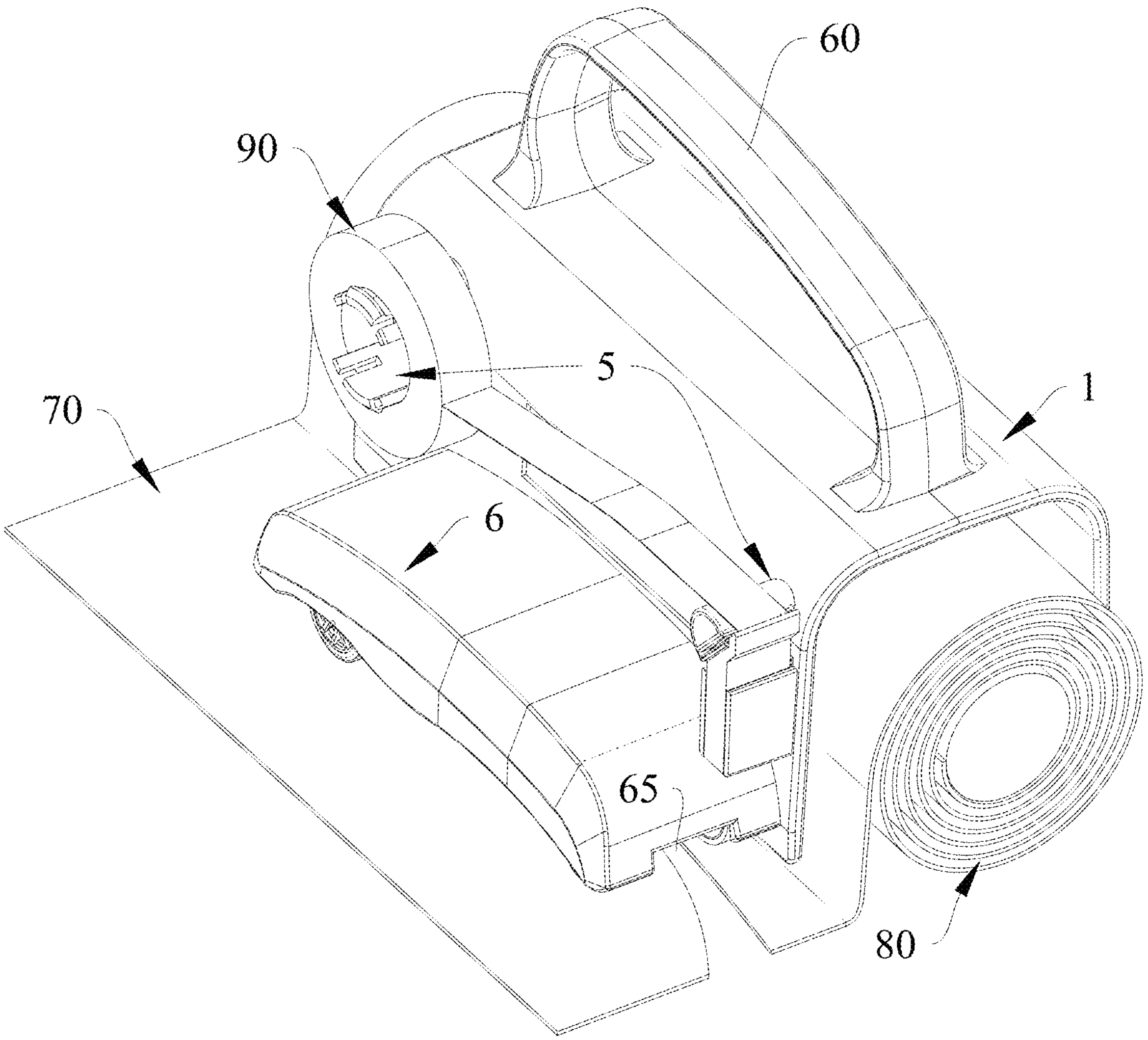
FIG. 1 is a structural schematic diagram of an integrated paper and adhesive tape cutting device in an embodiment of the present application.

1—paper separating housing
10—first end

20—second end
30—first side wall
40—second side wall
50—paper picking component
60—holding portion
70—paper
80—paper roll
90—adhesive tape roll
91—adhesive tape
111—sliding groove
2—cavity
3—cavity opening
4—paper cutter
44—cutting edge
5—adhesive tape cutting assembly
51—adhesive tape sleeving shaft
52—serrated knife
53—knife fixing member
54—protective assembly
541—sliding member
542—spring
543—protective member
5411—spring mounting hole
5412—sliding rail
6—paper cutting housing
61—side portion
62—lower edge
63—paper guiding edge
64—paper feeding end
65—paper discharging groove
66—support wheel mounting rib plate
67—paper pushing member mounting rib plate
68—paper guiding member mounting rib plate
69—guiding wheel mounting rib plate
7—guiding and pressing structure
21—paper pushing wheel member
22—fixing shaft member
23—paper guiding wheel member
24—second group of support wheels
8—slit
9—support structure
**9*a*, 9*b***—first group of support wheels
100—paper picking component
11—tip
12—bearing surface
13—bottom plane
14—contact bearing surface
15—elastic buckle
16—blade mounting groove
17—elastic buckle mounting groove

DETAILED DESCRIPTION OF EMBODIMENTS

The present application is described in detail below with reference to the accompanying drawings and in conjunction with embodiments. Each example is provided to explain the present application instead of limiting the present application. In fact, those skilled in the art will know that modifications and variations may be made in the present application without departing from the scope or spirit of the present application. For example, features shown or described as part of one embodiment may be used in another embodiment to produce yet another embodiment. Therefore, it is expected that the present application includes such modifications and variations that fall within the scope of the appended claims and equivalents thereof.

In the descriptions of the present application, orientations or positional relationships indicated by the terms "longitudinal", "transverse", "upper", "lower", "front", "rear", "left", "right", "vertical", "horizontal", "top", "bottom" and the like are orientations or positional relationships based on the drawings, are only for the purpose of facilitating describing of the present application, and do not indicate that the present application must be constructed and operated in the specific orientations. Therefore, they cannot be understood as limitations on the present application. The terms "connection", "connecting" and "arrangement" used in the present application should be understood in a broad sense, for example, the connection may be fixed connection, and may also be detachable connection; the connection may be a direct connection, and may also be indirect connection by means of intermediate components; the connection may be wired electrical connection and wireless electrical connection, and may also be wireless communication signal connection; and for those of ordinary skill in the art, the specific meanings of the above-mentioned terms can be understood according to the specific situations.

The accompanying drawings show one or more examples of the present application. Numeral and letter marks are used in the detailed descriptions to refer to the features in the accompanying drawings. Similar or like marks in the accompanying drawings and the descriptions have been used to refer to similar or like parts of the present application. As used herein, the terms "first", "second" and "third" and the like are used interchangeably to distinguish one member from another and are not intended to denote the location or importance of individual members.

As shown in FIG. 1 to FIG. 9, according to an embodiment of the present application, an integrated paper and adhesive tape cutting device is provided and includes a housing, where the housing includes a paper cutting housing 6 and a paper separating housing 1, and the paper separating housing 1 has a first end 10 and a second end 20 which are axially through and open. The open design of the first end 10 and the second end 20 reduces the operation complexity for a user during mounting of a paper roll, improves the working efficiency, is particularly suitable for occasions where the paper roll is replaced frequently, and is more suitable for the paper rolls 80 with different lengths. The paper separating housing 1 is defined by means of a first side wall 30 and a second side wall 40 thereof to form a cavity 2 capable of accommodating the elongated paper roll 80, the user can place the paper roll 80 in the cavity 2 easily or take out same easily, and the mounting and replacement process of the paper roll is simplified. An outer wall from the first end 10 to the second end 20 defines the length of the paper separating housing 1, so that it is ensured that the paper roll 80 can be stably placed during use, the deviation phenomenon of the paper due to shaking of the paper roll is reduced, and the cutting precision is improved. An adhesive tape cutting assembly 5 fixedly mounted on an outer wall of the paper separating housing 1 is configured to be sleeved with an adhesive tape roll 90 and cut an adhesive tape 91. The adhesive tape cutting assembly 5 is fixedly mounted on the outer wall of the paper separating housing 1, thereby achieving the multi-functional integrated design, reducing the operation burden of the user, and improving the overall working efficiency. By means of such integrated design, the space is saved, and the entire device is more compact and beautiful and is convenient to store and carry. A paper picking component 100 includes a first portion **100*a* and a second portion 100*b* connected to the first portion 100*a*, where one end of the second portion 100*b* is connected to the paper cutting housing 6. In some embodiments, an elastic buckle 15 is arranged at one end of the second portion 100***b*, and an elastic buckle mounting groove 17 matched with the elastic buckle 15 is formed in the paper cutting housing 6. The first portion 100*a* is in an elongated shape, one end of the first portion 100*a* is provided with a flat and pointed tip 11 capable of picking paper upwards, a paper feeding slit 8 is formed between a paper guiding edge 63 of the paper cutting housing 6 and the paper picking component 100, and a paper cutter 4 is arranged inside the slit 8. In some embodiments, the paper cutter 4 is arranged inside a blade mounting groove 16 of the paper picking component 100, and a cutting edge 44 of the paper cutter 4 faces the tip 11 and is configured to cut the paper 70 entering the slit 8. Two ends of a guiding and pressing structure 7 can be respectively arranged on two sides of the paper picking component 100; and during operation of a paper cutting device, the guiding and pressing structure 7 can continuously press the paper 70 entering the slit 8 downwards from two sides of the paper picking component 100 to bend the paper 70, and keep the stiffness and bending tension when the paper 70 is cut by the paper cutter 4. The paper 70 is discharged from a paper discharging groove 65 at a rear end of the paper cutting housing 6 after being cut.

In some embodiments, as shown in FIG. 1-FIG. 2, FIG. 3-FIG. 6 and FIG. 8-FIG. 9, the adhesive tape cutting assembly 5 includes an adhesive tape sleeving shaft 51 connected to the outer wall of the paper separating housing 1 and selectively sleeved with the adhesive tape roll 90, so that the user can replace different types of adhesive tape rolls easily, and the use convenience and flexibility are improved. The adhesive tape sleeving shaft 51 allows the adhesive tape roll 90 to rotate stably so as to pull out the adhesive tape 91, thereby ensuring that when the user pulls out the adhesive tape 91, the adhesive tape roll can rotate smoothly, and the resistance and the jamming phenomenon during pulling-out are reduced. A knife fixing member 53 is arranged on the same side as the adhesive tape sleeving shaft 51 and connected to the outer wall of the paper separating housing 1, so that the space is saved, and the entire device is more compact and beautiful. A serrated knife 52 is mounted on the knife fixing member 53, and the serrated design increases the cutting friction force and ensures rapid, precise and efficient cutting actions. The serrated knife 52 is configured to be capable of cutting the adhesive tape 91 pulled out from the adhesive tape roll 90. The design of the serrated knife 52 can adapt to the adhesive tapes of different thicknesses, and both thin and thick adhesive tapes can be smoothly cut, so that the applicability and versatility of the device are improved.

In some embodiments, as shown in FIG. 1, FIG. 2, FIG. 3-FIG. 6 and FIG. 8-FIG. 9, the adhesive tape cutting assembly 5 further includes a protective assembly 54; the protective assembly 54 includes a sliding member 541 and a spring mounting hole 5411 for mounting a spring 542; and when an external force is applied to the sliding member 541, the sliding member 541 moves along a sliding groove 111 to expose the serrated knife 52 for cutting. The sliding member 541 hides the serrated knife 52 when no external force is applied, thereby ensuring that the cutting edge 44 is not exposed to the outside in a non-use state, reducing the accidental contact risk, and improving the use safety. When the user needs to cut the adhesive tape 91, all that is needed is to apply the external force to enable the sliding member 541 to move along the sliding groove 111, and then the serrated knife 52 can be exposed for cutting. Such design simplifies operation steps, thereby improving the use convenience.

Figure 8:
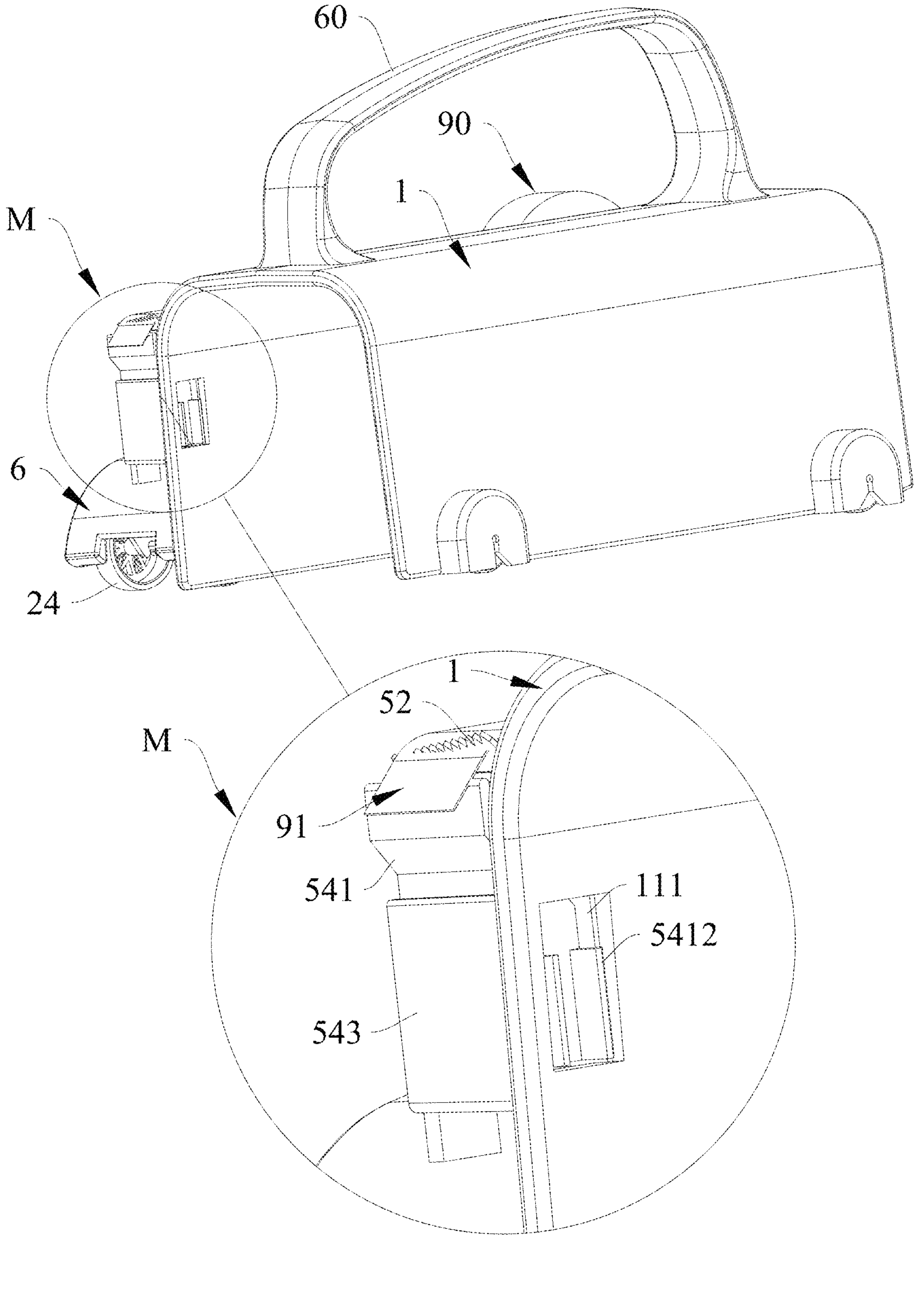
FIG. 8 is an enlarged view at part M of an integrated paper and adhesive tape cutting device and a protective assembly during cutting of paper in an embodiment of the present application.
Figure 9:
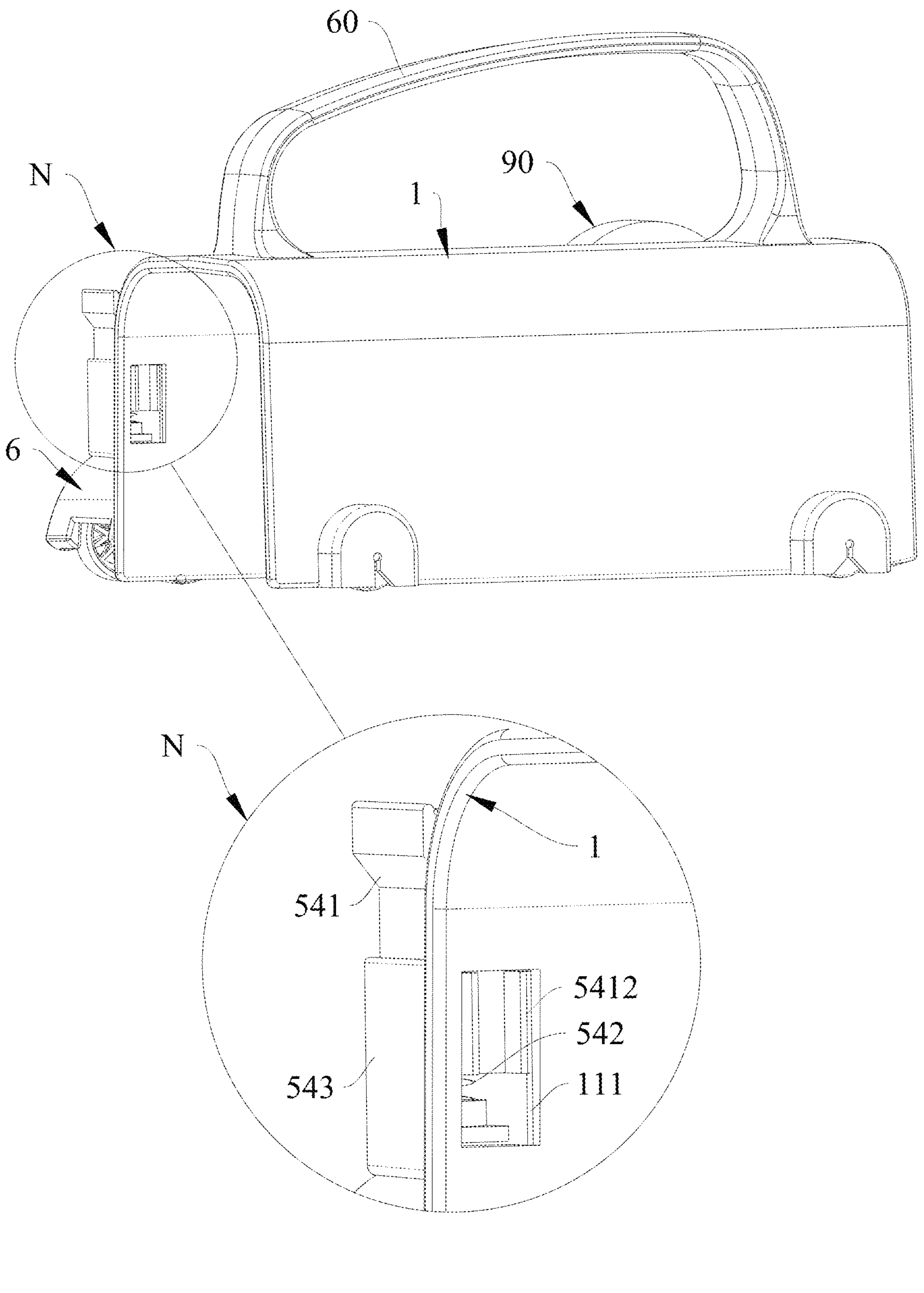
FIG. 9 is an enlarged view at part N of an integrated paper and adhesive tape cutting device and a protective assembly in a protective state in an embodiment of the present application.

As shown in FIG. 8-FIG. 9, the sliding groove 111 is formed in the paper separating housing 1, the sliding member 541 is provided with a sliding rail 5412, the sliding groove 111 is matched with the sliding rail 5412, and the sliding groove 111 defines a movement range and direction of the sliding member 541. It is ensured that the sliding member 541 moves stably along a predetermined path, the loosening or shaking phenomenon is reduced, and the mechanical reliability of the entire device is improved.

Figure 2:
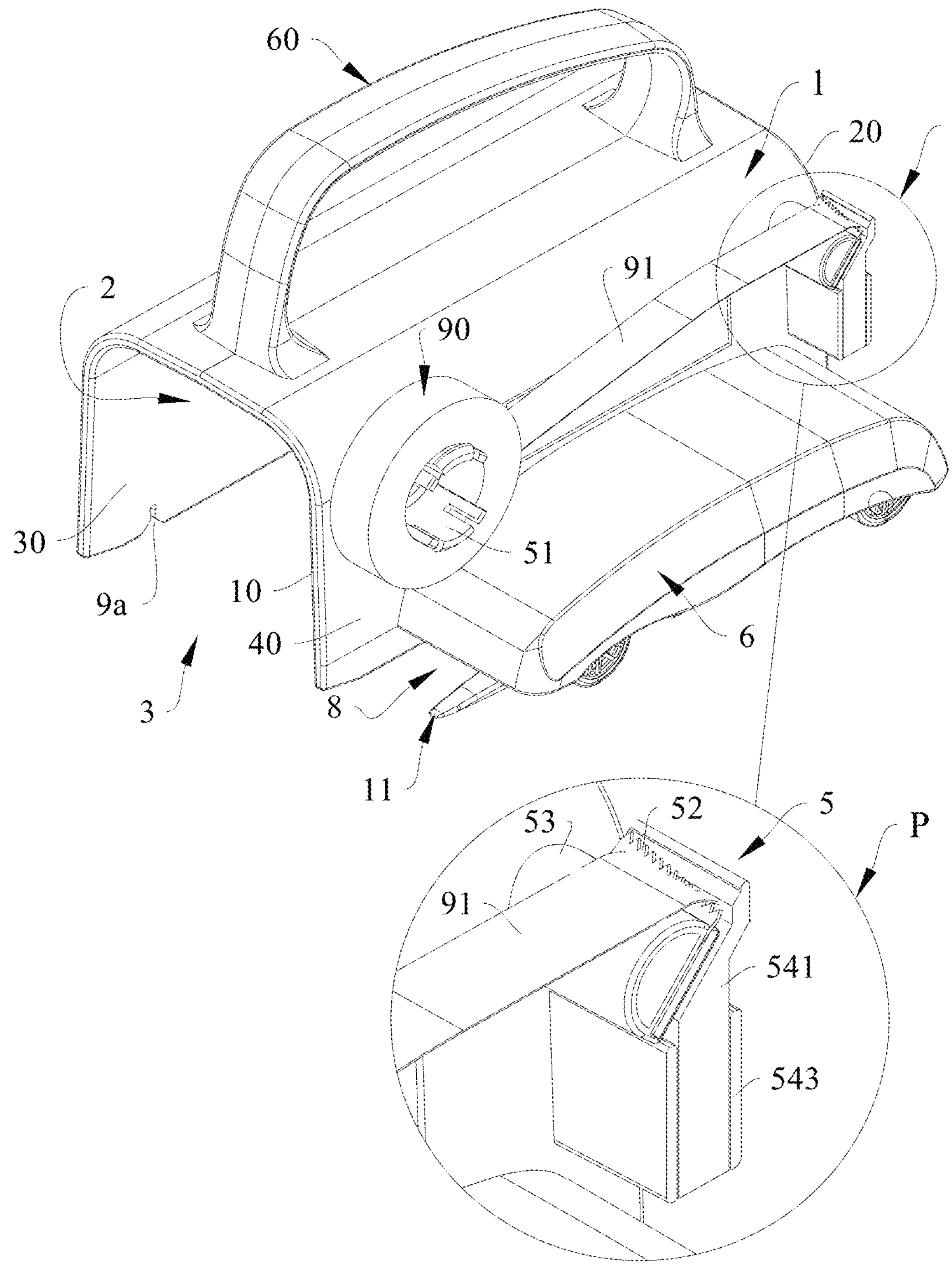
FIG. 2 is a structural schematic diagram of components of an integrated paper and adhesive tape cutting device in an embodiment of the present application and an enlarged view at part P.

In some embodiments, as shown in FIG. 2 and FIG. 8-FIG. 9, the protective assembly 54 further includes the spring 542, where when the external force is removed from the sliding member 541, the spring 542 provides an elastic force for the sliding member 541, the spring 542 pushes back the sliding member 541 to an initial position, and the cutting edge of the serrated knife 52 is hidden by the sliding member 541. An automatic reset function ensures that the cutting edge of the serrated knife 52 is in a hidden state all the time when not in use, and the need for manual resetting by the user is reduced. The external force needs to be applied once to enable the sliding member 541 to move to expose the serrated knife 52 for cutting, and after the external force is removed, the spring 542 can automatically reset the sliding member 541, so that the operation steps are simplified, and the use convenience is improved. The automatic reset function helps to keep the cleanliness inside the device, reduces the opportunity of external pollutants entering the device, and ensures the long-term stable operation of the device.

The protective assembly 54 further includes a protective member 543 which constitutes a housing portion of the protective assembly 54 and protects and supports the entire structure. The protective member 543 is configured to accommodate and mount the sliding member 541 and support the spring 542. The stability of the spring 542 is ensured when the elastic force is provided, and the failure or deformation of the spring 542 due to external factors is avoided.

Figure 3:
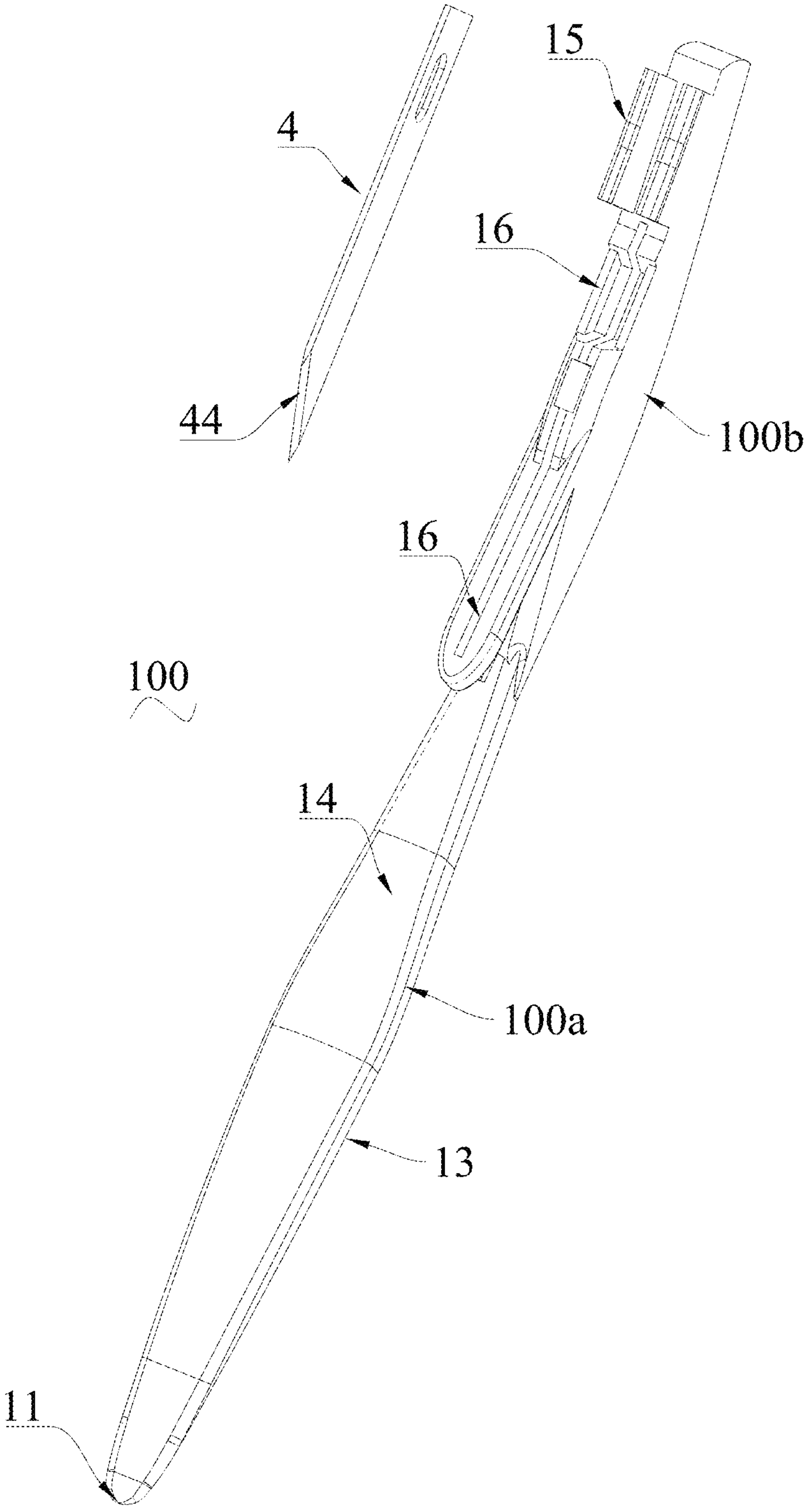
FIG. 3 is a specific structural schematic diagram of a paper picking component in an embodiment of the present application.

In some embodiments, as shown in FIG. 3, the paper cutter 4 is arranged at the second portion 100*b* of the paper picking component 100, or the paper cutter 4 is arranged inside the paper cutting housing 6, and the cutting edge 44 of the paper cutter 4 faces an inlet (not shown) of the slit 8. If the paper cutter 4 is arranged at the second portion 100*b* of the paper picking component 100, the deviation of the paper can be reduced, and the cutting precision can be ensured; and if it is arranged inside the paper cutting housing 6, a stable cutting environment is provided, and the cutting quality is further improved. The hidden design of the paper cutter 4 also helps to protect the cutting edge and prolong the service life thereof.

In some embodiments, as shown in FIG. 1-FIG. 9, the paper cutting housing 6 and the paper separating housing 1 are of an integrated structure. The integrated structure provides the higher overall mechanical strength, ensures that the components cannot be loosened or separated during use, and enhances the stability and reliability of the device. The user can implement paper separating, paper cutting and adhesive tape cutting functions in the integrated device, thereby reducing the switching among different devices, and improving the working efficiency.

In some embodiments, the paper cutting housing 6 and the paper separating housing 1 are of a detachable structure (not shown). The detachable structure allows the user to disassemble and replace damaged or aged components easily, thereby prolonging the service life of the device. For example, if a paper cutting portion or a paper separating portion breaks down, the user can replace the defective portion separately, and the entire device is not required to be replaced. The user can select whether to mount a paper separating assembly according to actual requirements, or flexibly combine and use same according to different use scenes, thereby enhancing the versatility and adaptability of the device. Due to the detachable structure, the interior is easier to clean, the possibility of dust and sundry accumulation is reduced, and the long-term stable operation of the device is maintained.

In some embodiments, the outer side of the paper cutting housing 6 is further provided with a side portion 61 extending downwards, and a lower edge 62 of the side portion 61 can assist in pressing down the paper entering the slit 8. It is ensured that the paper keeps the correct path and the appropriate tension when entering a cutting area. Due to the design of the side portion 61 and the lower edge 62, the paper is more stable when entering the cutting area, and the risk of tearing or damage caused by the sudden stress is reduced.

In some embodiments, as shown in FIG. 2 and FIG. 4-FIG. 6, the integrated paper and adhesive tape cutting device further includes a cavity opening 3 which is formed in the outer wall of the paper separating housing 1, is axially formed from the first end 10 to the second end 20, and is in communication with the cavity 2, where the to-be-cut paper 70 of the paper roll 80 is selectively pulled out from the cavity opening 3, and the first side wall 30 and the second side wall 40 of the paper separating housing 1 adjacent to the cavity opening 3 are selected for paper separation. By means of the cavity opening 3, the user can pull out the to-be-cut paper easily, thereby simplifying the paper taking process, and improving the operation convenience. The design of the cavity opening 3 ensures that the paper is correctly guided and positioned before entering the cutting area, thereby reducing the deviation possibility of the paper, and improving the paper separating precision. The paper is guided out from the cavity opening 3, so that the winding or jamming of the paper in a narrow space can be avoided, the jamming phenomenon during operation is reduced, and the reliability of the device is improved.

In some embodiments, as shown in FIG. 2 and FIG. 4-FIG. 7, the integrated paper and adhesive tape cutting device further includes a support structure 9, where the support structure 9 includes a first group of support wheels **9*a*, 9*b*, and the first group of support wheels 9*a*, 9*b* are arranged at the bottom of the paper separating housing 1, so that the stable support effect can be provided, and it is ensured that the paper separating housing 1 is kept horizontal and stable during operation. Thus, the entire device is easy to move on a desktop, the user can conveniently adjust the position according to requirements, the use convenience is improved, the device is particularly suitable for operations on the desktop or a plane, and the shaking possibility of the device is reduced. The first group of support wheels 9*a*, 9*b* selectively make contact with the paper 70 and support the paper separating housing 1. The design of the support wheels 9*a*, 9*b* allows the user to select whether to make contact with the paper 70 according to the actual requirements, thereby providing more operation flexibility. In some embodiments, when the closer contact with the paper is needed, the positions of the support wheels 9*a*, 9*b* can be adjusted to enhance the support effect. In some embodiments, when no additional support is needed, the support wheels 9*a*, 9*b*** can be moved away to avoid unnecessary interference.

In some embodiments, as shown in FIG. 2 and FIG. 4-FIG. 7, the support structure 9 further includes a second group of support wheels **24*a*, 24*b* which are mounted by means of support wheel mounting rib plates 66 and connected to the bottom of the paper cutting housing 6, so that the additional support points can be provided for the paper cutting housing 6, and it is ensured that the paper cutting housing is kept horizontal and stable during operation. Particularly, when the thick or large paper is processed, it can be ensured that the device is not inclined or turned over. The design of the second group of support wheels 24*a*, 24*b* provides the support function and enables the entire device to be easy to move on the desktop, so that the user can conveniently adjust the position according to requirements, and the use convenience is improved. The second group of support wheels 24*a*, 24*b* selectively make contact with the paper 70 and support the paper cutting housing 6. The first group of support wheels 9*a*, 9*b* arranged at the bottom of the paper separating housing 1 and the second group of support wheels 24*a*, 24*b* arranged at the bottom of the paper cutting housing 6** act jointly to form a double support system. Such design further enhances the stability and reliability of the entire device, and ensures the stable operation of the device particularly when handling complex tasks. The two groups of support wheels are respectively arranged at the bottoms of the different housings, so that the pressure can be dispersed when the device is lifted or moved, the pressure borne by the single support point is reduced, and the service life of the support structure is prolonged.

In some embodiments, as shown in FIG. 2, FIG. 4-FIG. 6 and FIG. 8-FIG. 9, the integrated paper and adhesive tape cutting device further includes a holding portion 60 which is connected to the paper separating housing 1. The holding portion 60 is connected to the paper separating housing 1, thereby providing a convenient holding point for the user. By means of such design, the user can lift or move the entire device more easily, thereby improving the operation convenience. When a force is applied to the holding portion 60, at least one component force is in a direction perpendicular to the support structure 9 to form a bottom plane. By means of such design, when the device is lifted, the component force can effectively offset the gravity of the device, thereby reducing the shaking possibility of the device, and enhancing the overall stability. The component force perpendicular to the bottom plane can provide an additional support when the device is lifted, thereby preventing the device from being inclined or turned over during lifting, and it is particularly important during processing of heavy paper rolls or frequent operations.

In some embodiments, as shown in FIG. 3, an upper surface of the paper picking component 100 from the tip 11 to the cutting edge 44 is a bearing surface 12, and the bearing surface 12 is an arched cambered surface and is configured to make contact with and support the paper 70 upwards. The bearing surface 12 which is the arched cambered surface provides the more uniform support force distribution, thereby avoiding the folding or jamming phenomenon of the paper in case of local uneven stress, and ensuring that the paper smoothly enters the cutting area. Under the guidance effect of the arched cambered surface, the paper can keep the relatively stable path when entering the cutting area, thereby reducing the deviation possibility of the paper, and improving the cutting precision.

In some embodiments, the bottom of the paper picking component 100 is a bottom plane 13 which is close to a support surface formed by the bottom of the support structure 9; and during operation of the paper cutting device, the bottom of the paper picking component 100 abuts against an original placement surface of the paper 70 which is not picked. It is ensured that the paper picking component 100 can stably abut against the original placement surface of the paper 70 which is not picked during operation, thereby reducing the shaking or inclining risk. The bottom plane 13 increases the contact area between the paper picking component 100 and the original placement surface (for example, the desktop), distributes more support force, avoids the situation of uneven local stress, enhances the overall stability, and reduces the risk of tearing or damage of the paper 70 due to sudden stress.

Figure 4:
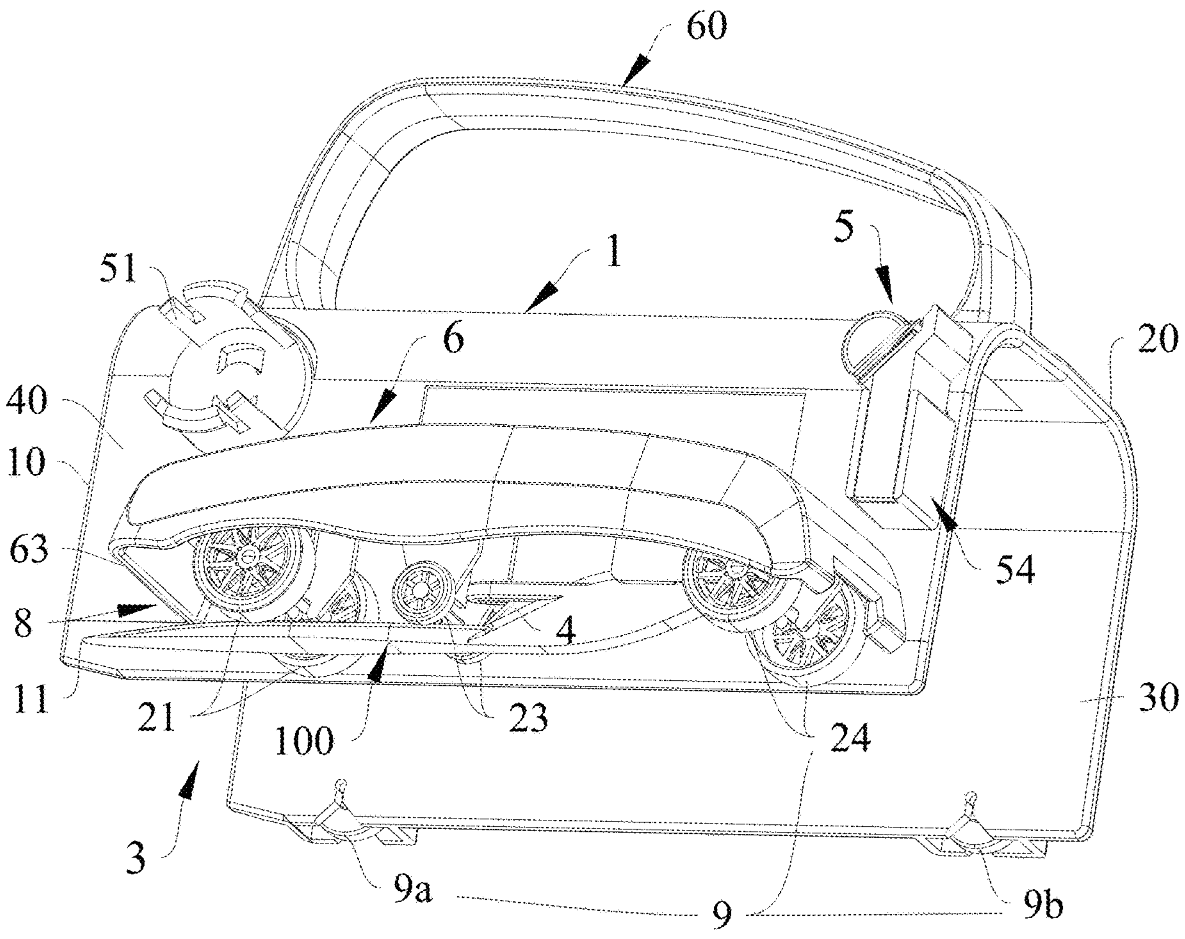
FIG. 4 is a structural schematic diagram of an integrated paper and adhesive tape cutting device in an embodiment of the present application at another angle.
Figure 5:
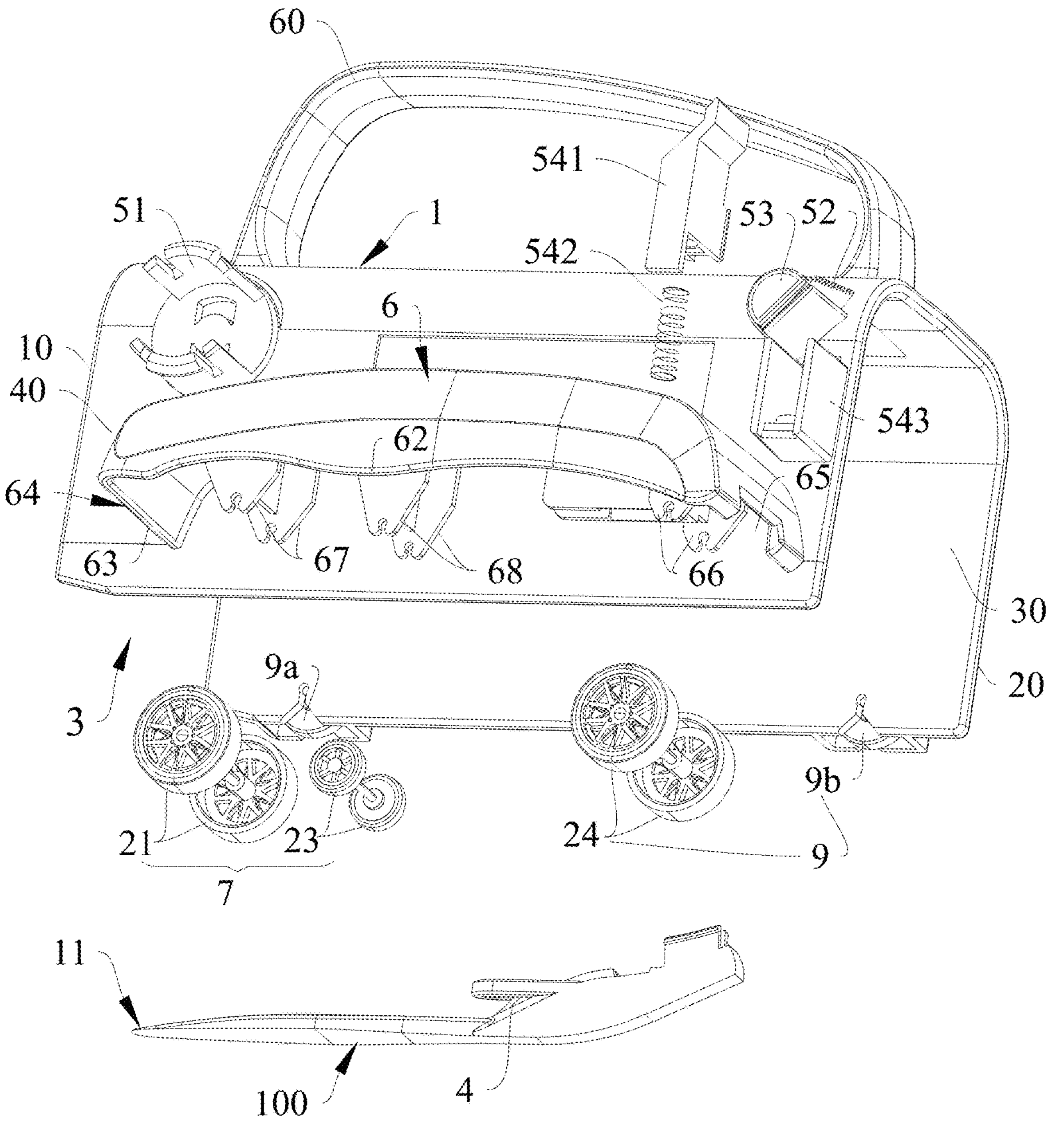
FIG. 5 is an exploded schematic diagram of FIG. 4 in an embodiment of the present application.
Figure 6:
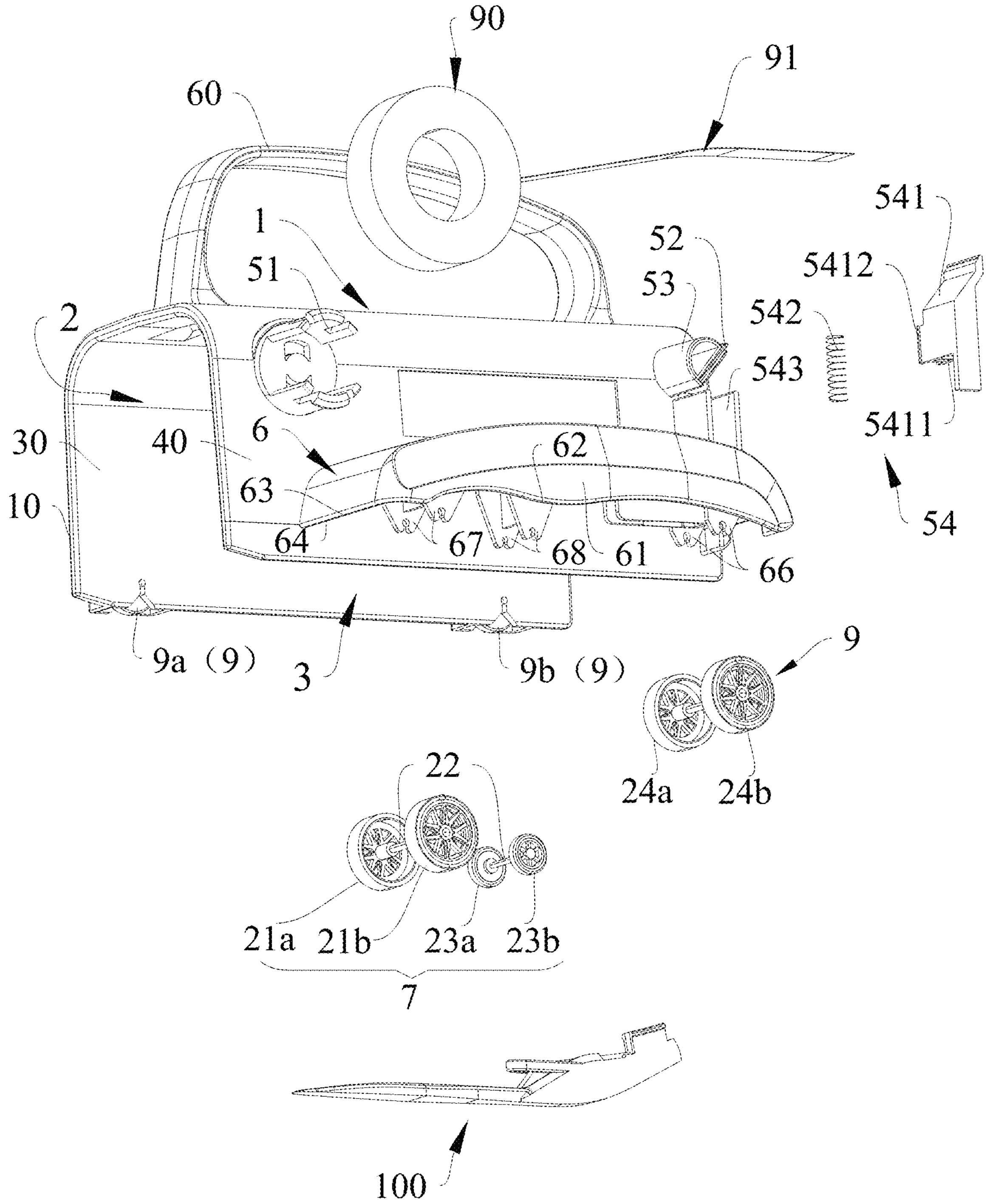
FIG. 6 is an exploded schematic diagram of an integrated paper and adhesive tape cutting device with an attached adhesive tape structure in an embodiment of the present application.
Figure 7:
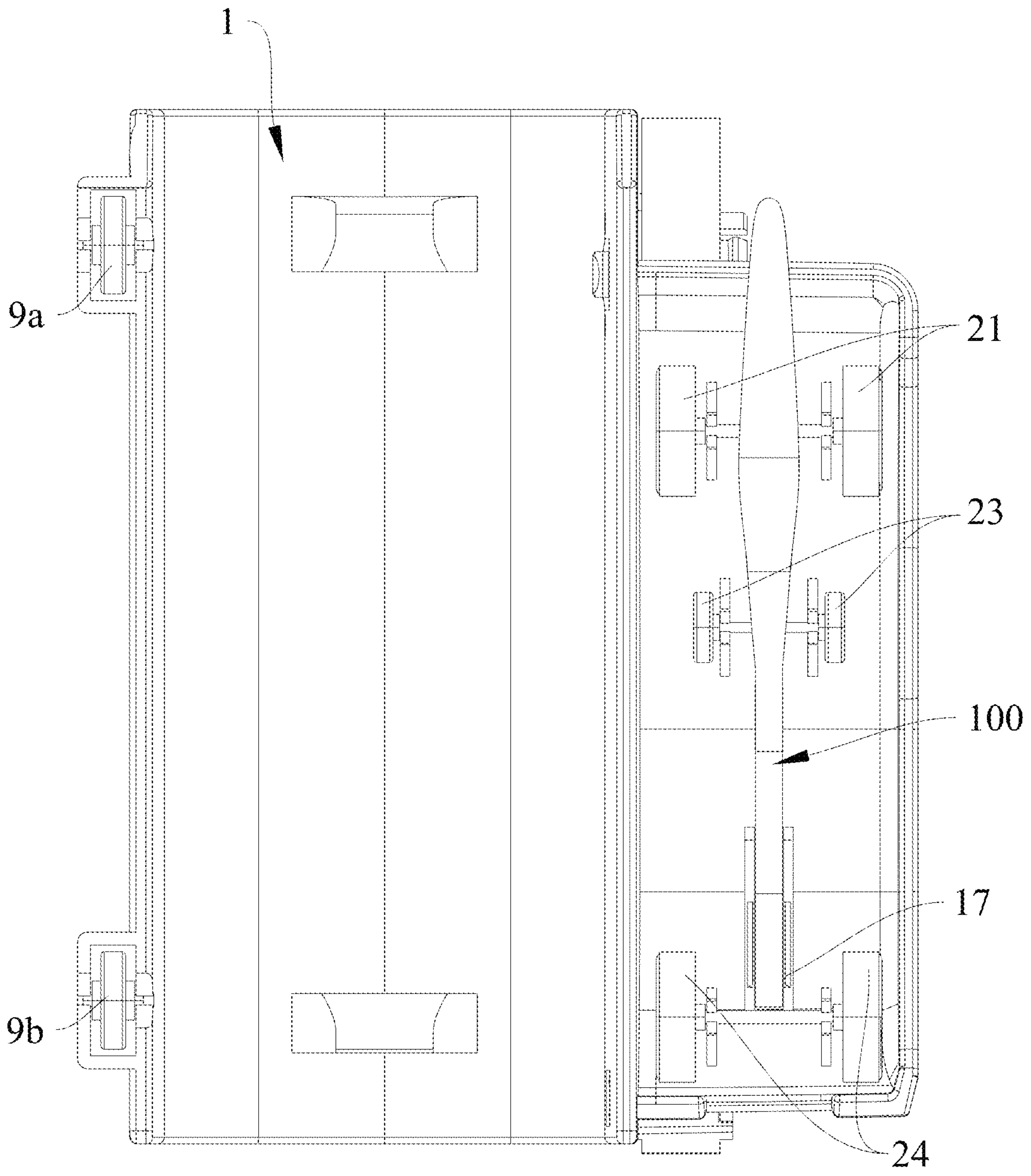
FIG. 7 is a bottom view of an integrated paper and adhesive tape cutting device in an embodiment of the present application.

In some embodiments, as shown in FIG. 4-FIG. 6, the guiding and pressing structure 7 includes a paper pushing member 21 which is connected to the paper cutting housing 6 and arranged close to a paper feeding end 64 of the paper cutting housing 6; and the paper pushing member 21 includes a first paper pushing member 21*a* and a second paper pushing member 21*b* which are respectively arranged on left and right sides of the paper picking component 100, thereby ensuring that the paper is subjected to uniform left and right pressure when entering the slit 8, and avoiding inclining or jamming of the paper due to uneven stress on the single side. When the to-be-cut paper 70 enters the slit 8, the first paper pushing member 21*a* and the second paper pushing member 21*b* position and guide in the to-be-cut paper 70 synchronously in a direction of the cutting edge 44. The paper pushing member 21 provides the stable guidance effect, thereby reducing the jamming or blocking possibility when the paper enters the slit 8, and improving the operation smoothness. When guiding in the paper, the paper pushing member 21 can continuously apply certain pressure to the paper, so that the paper 70 keeps the stiffness when entering the slit 8, and the stability of the paper and the precision during cutting are enhanced.

In some embodiments, as shown in FIG. 4-FIG. 6, the guiding and pressing structure 7 further includes a paper guiding member 23 which is connected to the paper cutting housing 6, the paper guiding member 23 includes a first paper guiding member 23*a* and a second paper guiding member 23*b* which are respectively arranged on the left and right sides of the paper picking component 100, and when the to-be-cut paper 70 is guided in from a bottom contact point of the paper pushing member 21 to the cutting edge 44, the first paper guiding member 23*a* and the second paper guiding member 23*b* position and guide in the to-be-cut paper 70 in the direction of the cutting edge 44. The first paper guiding member 23*a* and the second paper guiding member 23*b* provide the stable guidance effect during guiding in of the paper, so that the paper keeps the fixed path when entering the cutting area, and the stability of the paper and the precision during cutting are enhanced. The first paper guiding member 23*a*, the second paper guiding member 23*b*, the first paper pushing member 21*a* and the second paper pushing member 21*b* act jointly to form a complete paper guiding-in system. The paper pushing member 21 is responsible for guiding in the paper from the paper feeding end 64, and the paper guiding member 23 ensures that the paper keeps the correct path when entering the cutting area. Such cooperative effect remarkably improves the guiding-in precision and stability of the paper. A double guidance mechanism of the paper guiding member 23 and the paper pushing member 21 can disperse the pressure during guiding-in of the paper, reduces the pressure borne by the single component, and prolongs the service life of the device.

In some embodiments, as shown in FIG. 4-FIG. 6, outer diameters of the first paper pushing member 21*a* and the second paper pushing member 21*b* are greater than outer diameters of the first paper guiding member 23*a* and the second paper guiding member 23*b*, and a distance between the first paper pushing member 21*a* and the second paper pushing member 21*b* is greater than a distance between the first paper guiding member 23*a* and the second paper guiding member 23*b*. Under the pressure angle effect formed when the paper 70 enters the cutting area, ends of the paper 70 can be more closely attached to the cutting edge 44, which increases the pressure during cutting, and improves the cutting effect and precision. The paper pushing member 21 with the large outer diameter and the small paper guiding member 23 can provide the relative pressure during guiding-in of the paper 70, so that the paper 70 forms a pressure angle and keeps certain stiffness and tension, the paper 70 is flatter during cutting, and the deviation or jamming risk of the paper 70 is reduced. Meanwhile, by means of the stable support provided by the paper pushing member 21 and the paper guiding member 23 during guiding-in of the paper, the risk of damage caused by excessive bending or folding of the paper is reduced, and the integrity of the paper is protected.

In some embodiments, as shown in FIG. 4-FIG. 6, the first paper pushing member 21*a* and the second paper pushing member 21*b* are connected by means of a fixing shaft member 22 and are rotationally connected to the bottom of the paper cutting housing 6 by means of paper pushing member mounting rib plates 67, and the first paper pushing member 21*a* and the second paper pushing member 21*b* are a group of rollers with the same outer diameter, so that the pressure applied to the paper is distributed more uniformly, and the risk of damage of the paper due to excessive local stress is reduced. The first paper pushing member 21*a* and the second paper pushing member 21*b* can rotate synchronously. The first paper guiding member 23*a* and the second paper guiding member 23*b* are connected by means of a fixing shaft member 22 and are rotationally connected to the bottom of the paper cutting housing 6 by means of paper guiding member mounting rib plates 68, the first paper guiding member 23*a* and the second paper guiding member 23*b* are a group of rollers with the same outer diameter, and the first paper guiding member 23*a* and the second paper guiding member 23*b* can rotate synchronously. Thus, the paper can keep the relatively stable path when entering the cutting area, thereby reducing the deviation possibility of the paper, and improving the guiding-in precision and stability. The roller design reduces the friction force between the paper and the surface of the device, so that the paper can be guided into the cutting area more easily, the jamming phenomenon is reduced, and the operation smoothness is improved. The paper pushing member 21 and the paper guiding member 23 are detachably mounted on the inner wall of the paper cutting housing 6 by means of the fixing shaft members 22, so that the user can disassemble and replace the damaged or aged components easily, thereby prolonging the service life of the device. The design of the fixing shaft members 22 ensures that the paper pushing member 21 and the paper guiding member 23 can be aligned accurately and rotate synchronously, thereby ensuring the precision and stability of the paper during guiding-in.

The above are merely some embodiments of the present application and are not intended to limit the present application, and various changes and variations may be made on the present application by those skilled in the art. Any modification, equivalent substitution, improvement, etc. made within the spirit and principles of the present application should fall within the scope of protection of the present application.

What is claimed is:

1. An integrated paper and adhesive tape cutting device, comprising:

a housing which comprises a paper cutting housing;

a paper picking component which comprises a first portion and a second portion connected to the first portion, wherein one end of the second portion is connected to the paper cutting housing, the first portion is in an elongated shape, and one end of the first portion is provided with a flat and pointed tip capable of picking paper upwards;

a slit which is formed between the paper cutting housing and the paper picking component and is configured for paper feeding; and a paper cutter which is arranged inside the slit, wherein a cutting edge of the paper cutter faces the tip, and the paper cutter is configured to cut the paper entering the slit;

wherein the housing further comprises a paper separating housing, the paper separating housing is defined by a side wall thereof to form a first cavity capable of accommodating an elongated paper roll; the paper cutting housing defines a second cavity, an inner side of the side wall faces the first cavity; a reverse side, relative to the inner side, of the side wall is provided with the paper cutting housing, such that the first cavity is separated from the second cavity by the side wall; an adhesive tape cutting assembly which is fixedly mounted on an outer wall of the housing and is configured to be sleeved with an adhesive tape roll and cut an adhesive tape.

2. The integrated paper and adhesive tape cutting device according to claim 1, wherein the adhesive tape cutting assembly comprises:

an adhesive tape sleeving shaft which is connected to the outer wall of the paper separating housing, is selectively sleeved with the adhesive tape roll, and allows the adhesive tape roll to rotate stably so as to pull out the adhesive tape; and a knife fixing member which is arranged on the same side as the adhesive tape sleeving shaft and connected to the outer wall of the paper separating housing, a serrated knife being mounted on the knife fixing member and configured to be capable of cutting the adhesive tape pulled out from the adhesive tape roll.

3. The integrated paper and adhesive tape cutting device according to claim 2, wherein the adhesive tape cutting assembly further comprises a protective assembly; and the protective assembly comprises:

a sliding member, wherein when an external force is applied to the sliding member, the sliding member moves along a sliding groove to expose the serrated knife for cutting; and a spring, wherein when the external force is removed from the sliding member, the spring provides an elastic force for the sliding member such that the sliding member is pushed back to an initial position and a cutting edge of the serrated knife is hidden.

4. The integrated paper and adhesive tape cutting device according to claim 3, wherein the sliding groove is formed in the paper separating housing, the sliding member is provided with a sliding rail, the sliding groove is matched with the sliding rail, and the sliding groove defines a movement range and direction of the sliding member.

5. The integrated paper and adhesive tape cutting device according to claim 3, wherein the protective assembly further comprises:

a protective member which constitutes a housing portion of the protective assembly and is configured to accommodate and mount the sliding member and provide a support for the spring.

6. The integrated paper and adhesive tape cutting device according to claim 1, wherein the paper cutter is arranged at the second portion of the paper picking component, or the paper cutter is arranged inside the paper cutting housing.

7. The integrated paper and adhesive tape cutting device according to claim 1, wherein the paper cutting housing and the paper separating housing are of an integrated structure.

8. The integrated paper and adhesive tape cutting device according to claim 1, wherein the paper cutting housing and the paper separating housing are of a detachable structure.

9. The integrated paper and adhesive tape cutting device according to claim 1, further comprising:

a cavity opening which is formed in the outer wall of the paper separating housing, is axially formed from the first end to the second end, and is in communication with the first cavity, wherein the to-be-cut paper of the paper roll is selectively pulled out from the cavity opening, and a first side wall or a second side wall on one side of the paper separating housing adjacent to the cavity opening is selected for paper separation.

10. The integrated paper and adhesive tape cutting device according to claim 1, further comprising:

a support structure which comprises a first group of support wheels, wherein the first group of support wheels are arranged at the bottom of the paper separating housing; and the first group of support wheels selectively make contact with the paper and support the paper separating housing.

11. The integrated paper and adhesive tape cutting device according to claim 10, further comprising:

a holding portion which is connected to the paper separating housing, wherein when a force is applied to the holding portion, at least one component force is in a direction perpendicular to the support structure to form a bottom plane; and/or the support structure further comprises a second group of support wheels which are arranged at and connected to the bottom of the paper cutting housing, and the second group of support wheels selectively make contact with the paper and support the paper cutting housing.

12. The integrated paper and adhesive tape cutting device according to claim 10, wherein the bottom of the paper picking component is a bottom plane which is arranged close to a support surface formed by the bottom of the support structure; and during operation of a paper cutting device, the bottom of the paper picking component abuts against an original placement surface of the paper.

13. The integrated paper and adhesive tape cutting device according to claim 1, wherein an upper surface of the paper picking component from the tip to the cutting edge of the paper cutter is a bearing surface, and the bearing surface is an arched cambered surface and is configured to make contact with and support the paper upwards; and the tip is exposed outwards relative to a paper feeding end of the paper cutting housing.

14. The integrated paper and adhesive tape cutting device according to claim 1, further comprising a guiding and pressing structure, wherein two ends of the guiding and pressing structure are respectively arranged on two sides of the paper picking component; and during operation of a paper cutting device, the guiding and pressing structure is capable of continuously pressing the paper entering the slit downwards from two sides of the paper picking component to bend the paper, and keeping the stiffness and bending tension when the paper is cut by the paper cutter.

15. The integrated paper and adhesive tape cutting device according to claim 14, wherein the guiding and pressing structure comprises a paper pushing member which is connected to the paper cutting housing and arranged close to a paper feeding end of the paper cutting housing; and the paper pushing member comprises a first paper pushing member and a second paper pushing member which are respectively arranged on left and right sides of the paper picking component, and when the to-be-cut paper enters the slit, the first paper pushing member and the second paper pushing member position and guide in the to-be-cut paper synchronously in a direction of the cutting edge of the paper cutter.

16. The integrated paper and adhesive tape cutting device according to claim 15, wherein the guiding and pressing structure further comprises a paper guiding member which is connected to the paper cutting housing, the paper guiding member comprises a first paper guiding member and a second paper guiding member which are respectively arranged on the left and right sides of the paper picking component, and when the to-be-cut paper is guided in from a bottom contact point of the paper pushing member to the cutting edge of the paper cutter, the first paper guiding member and the second paper guiding member position and guide in the to-be-cut paper in the direction of the cutting edge of the paper cutter.

17. The integrated paper and adhesive tape cutting device according to claim 16, wherein the first paper pushing member and the second paper pushing member are connected by a fixing shaft member, the first paper pushing member and the second paper pushing member are a group of rollers with the same outer diameter, and the first paper pushing member and the second paper pushing member are capable of rotating synchronously; and the first paper guiding member and the second paper guiding member are connected by a fixing shaft member, the first paper guiding member and the second paper guiding member are a group of rollers with the same outer diameter, and the first paper guiding member and the second paper guiding member are capable of rotating synchronously.

18. The integrated paper and adhesive tape cutting device according to claim 16, wherein a distance between the first paper pushing member and the second paper pushing member is greater than a distance between the first paper guiding member and the second paper guiding member.

19. The integrated paper and adhesive tape cutting device according to claim 1, wherein the paper separating housing is substantially a U-shaped structure.

* * * * *